United States Patent [19]

Miyasaka

[11] Patent Number: 5,478,674
[45] Date of Patent: Dec. 26, 1995

[54] NONAQUEOUS ELECTROLYTE-SECONDARY BATTERY

[75] Inventor: Tsutomu Miyasaka, Minami-ashigara, Japan

[73] Assignee: Fuji Photo Film Co., Ltd., Kanagawa, Japan

[21] Appl. No.: 233,929

[22] Filed: Apr. 28, 1994

[30] Foreign Application Priority Data

| Apr. 28, 1993 | [JP] | Japan | 5-102931 |
| Jun. 25, 1993 | [JP] | Japan | 5-155426 |
| Jul. 14, 1993 | [JP] | Japan | 5-174380 |

[51] Int. Cl.$^6$ .............................. H01M 4/02; H01M 4/48
[52] U.S. Cl. .................. 429/218; 429/223; 429/224
[58] Field of Search ....................... 429/223, 224, 429/218

[56] References Cited

U.S. PATENT DOCUMENTS

| 4,302,518 | 11/1981 | Goodenough et al. | |
| 4,366,215 | 12/1982 | Coetzer et al. | |
| 4,478,921 | 10/1984 | Langan. | |
| 4,507,371 | 3/1985 | Thackeray et al. | |
| 5,166,012 | 11/1992 | Rossouw et al. | |
| 5,169,736 | 12/1992 | Bittihn et al. | 429/223 |
| 5,219,680 | 6/1993 | Fauteux | 429/192 |
| 5,264,201 | 11/1993 | Dahn et al. | 429/223 |
| 5,286,582 | 2/1994 | Tahara et al. | 429/218 |

FOREIGN PATENT DOCUMENTS

| 0391281 | 10/1990 | European Pat. Off. |
| 0468942 | 1/1992 | European Pat. Off. |
| 0484187 | 5/1992 | European Pat. Off. |
| 0504678 | 9/1992 | European Pat. Off. |
| 0511632 | 11/1992 | European Pat. Off. |
| 0554649 | 8/1993 | European Pat. Off. |
| 0554906 | 8/1993 | European Pat. Off. |
| 0555594 | 8/1993 | European Pat. Off. |
| 0563988 | 10/1993 | European Pat. Off. |
| 0567149 | 10/1993 | European Pat. Off. |

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

A lithium ion type nonaqueous electrolyte-secondary battery which comprises a positive electrode which comprises, as an active material, a compound oxide represented by the following chemical formula (I):

$$Li_x A_y M_z J_m O_p \qquad (I)$$

wherein A represents at least one alkali element selected from the group consisting of Na and K; M represents at least one transition element selected from the group consisting of Co, Mn and Ni; J represents an element having a glass-forming ability selected from the group consisting of B, Si, Ge, P, V, Zr, Sb and Ti; $0.8 \leq x \leq 1.3$; $0 \leq y \leq 0.2$; $0.8 \leq z \leq 2.0$; $0.01 \leq m \leq 0.2$; and $2.0 \leq p \leq 2.7$; a negative electrode; and a nonaqueous electrolyte. The positive electrode-active material permits the production of nonaqueous electrolyte lithium type secondary batteries having excellent charge-discharge characteristics, discharge voltages and cycle properties.

12 Claims, No Drawings

NONAQUEOUS ELECTROLYTE-SECONDARY BATTERY

BACKGROUND OF THE INVENTION

The present invention relates to a lithium ion type nonaqueous electrolyte-secondary battery which is improved in the discharge quality and the cycle properties or the charge-discharge cycle life.

There have actively been investigated nonaqueous electrolyte-secondary batteries which make use of, as negative electrode-active materials, lithium-containing light metal alloys or substances capable of absorbing and releasing lithium ions because of their high electic voltages and high energy densities. On the other hand, there have generally been use d lamellar compounds which make use of intercalation of Li such as $LiMn_2O_4$, $Li_2MnO_3$, $LiCoO_2$, $LiCo_{0.5}Ni_{0.5}O_2$, $LiNiO_2$ and $MoS_2$ as positive electrode-active materials for secondary batteries. In particular, $LiCoO_2$ as disclosed in Japanese Un-examined Patent Publication (hereunder referred to as "J.P. KOKAI") No. Sho 55-136131 is useful because it can provide a battery having a high discharge voltage of not less than 3.5 V and a high capacity. However, the crystalline structure thereof gradually destroyed as the battery is repeatedly charged and discharged, the destruction of the crystalline structure becomes conspicuous if the degree of discharge is increased for the absorption of Li and the deterioration of the quality thereof proceeds. In respect of the charge-discharge cycle properties, however, it requires an improvement in stability of voltage and capacity like most of other materials for positive electrodes. Under such circumstances, there have been proposed in, for instance, Japanese Unexamined Patent Publication (hereunder referred to as "J.P. KOKAI") Nos. Hei 4-61760, Hei 4-162357, Hei 3-201368 and Hei 4-267053, methods for improving the charge-discharge characteristics and cycle properties of these secondary batteries which utilize compound oxides obtained by further adding polyvalent transition metals to the foregoing active materials. These methods permit improvement in the cycle properties such as stabilization of voltages, but they cannot simultaneously improve battery qualities such as capacity and discharge voltage. Moreover, the use of many polyvalent metals, in place of metals such as Co, Mn and Ni, has variously been proposed, but there has not yet been investigated any effect accomplished by the simultaneous use of polyvalent metals and monovalent alkali metals usable in place of Li.

SUMMARY OF THE INVENTION

Accordingly, an object of the present invention is to provide a lithium ion type nonaqueous electrolyte-secondary battery whose positive electrode-active material is excellent in a charge-discharge characteristics, discharge voltage and cycle properties.

The object of the present invention can be accomplished by providing a lithium ion type nonaqueous electrolyte-secondary battery which comprises a positive electrode comprising, as an active material, a compound oxide represented by the following chemical formula (I):

$$Li_xA_yM_zJ_mO_p \qquad (I)$$

wherein A represents at least one alkali element selected from the group consisting of Na and K; M represents at least one transition element selected from the group consisting of Co, Mn and Ni; J represents an element having a glass-forming ability selected from the group consisting of B, Si, Ge, P, V, Zr, Sb and Ti; $0.8 \leq x \leq 1.3$; $0 \leq y \leq 0.2$; $0.8 \leq z \leq 2.0$; $0.01 \leq m \leq 0.2$; and $2.0 \leq p \leq 2.7$; a negative electrode; and a nonaqueous electrolyte.

DESCRIPTION OF THE PREFERRED EMBODIMENTS

According to a first preferred embodiment of the present invention, there is provided a lithium ion type nonaqueous electrolyte-secondary battery which comprises a positive electrode which comprises, as an active material, a compound oxide represented by the following chemical formula: $Li_xA_yM_zJ_mO_p$ (wherein A represents at least one alkali element selected from the group consisting of Na and K; M represents at least one transition element selected from the group consisting of Co, Mn and Ni; J represents an element having a glass-forming ability selected from the group consisting of B, Si, Ge, P, V, Zr and Sb; $0.8 \leq x \leq 1.3$; $0.01 \leq y \leq 0.2$; $0.8 \leq z \leq 2.0$; $0.01 \leq m \leq 0.2$; and $2.0 \leq p \leq 4.7$), a negative electrode and a nonaqueous electrolyte. More preferably, in the foregoing formula, A is Na, M is Co, $0.8 \leq x \leq 1.3$; $0.02 \leq y \leq 0.1$; $0.8 \leq z \leq 1.0$; $0.02 \leq m \leq 0.1$; and $2.0 \leq p \leq 2.7$.

According to a second preferred embodiment of the present invention, there is provided a lithium ion type nonaqueous electrolyte-secondary battery which comprises a positive electrode, a negative electrode and a nonaqueous electrolyte, wherein the positive electrode comprises, as an active material, a compound oxide represented by the following chemical formula: $Li_xM_zGe_mO_p$, (wherein M represents at least one transition element selected from the group consisting of Co, Mn and Ni; $0.9 \leq x \leq 1.3$; $0.8 \leq z \leq 2.0$; $0.01 \leq m \leq 0.2$; and $2.0 \leq p \leq 4.5$). This embodiment corresponds to the second battery in which the positive electrode-active material comprises a compound oxide represented by the foregoing formula (I) wherein y=0. More preferably, in the foregoing formula, M is Co, $0.9 \leq x \leq 1.3$; $0.8 \leq z \leq 1.0$; $0.01 \leq m \leq 0.2$; and $2.0 \leq p \leq 2.2$.

According to a third preferred embodiment of the present invention, there is provided a nonaqueous electrolyte-secondary battery which comprises a positive electrode, a negative electrode and a nonaqueous electrolyte, wherein the positive electrode-active material comprises a compound oxide represented by the following chemical formula: $Li_xA_yM_zTi_mO_p$ (wherein A represents at least one alkali element selected from the group consisting of Na and K; M represents at least one transition element selected from the group consisting of Co, Mn and Ni; $0.8 \leq x \leq 1.3$; $0.01 \leq y \leq 0.2$; $0.8 \leq z \leq 2.0$; $0.01 \leq m \leq 0.2$; and $2.0 \leq p \leq 4.7$). More preferably, in the foregoing formula, A is Na, M is Co; $0.8 \leq x \leq 1.3$; $0.02 \leq y \leq 0.1$; $0.8 \leq z \leq 1.0$; $0.02 \leq m \leq 0.1$; and $2.0 \leq p \leq 2.7$.

The positive electrode-active material used in the present invention comprises $LiMO_2$ or $LiM_2O_4$ (wherein M is a transition element selected from the group consisting of Co, Mn and Ni) as an essential component to which trace amounts of dopants are added, a first dopant comprising an alkali metal such as Na and/or K used in place of Li element and a second dopant comprising at least one element selected from the group consisting of those having glass-forming abilities such as B, Si, Ge, P, V, Zr, Sb and Ti. Among these first and second dopants, Na seems to mainly contribute to improvement of the discharge voltage among the charge-discharge properties and an increase in the capac-

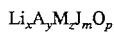

ity of the resulting battery, while the elements having glass-forming abilities seem to contribute to improvement in the capacity-maintaining rate among the cycle properties. In this respect, it is assumed that the intercalation of Na which has an ionic radius higher than that of Li and which is less diffusible would stabilize the structure of the active material during discharge (during release of Li) and establish a lattice structure which makes the diffusion (absorption, release) of Li ions easy and that the foregoing effect of Na can thus be ensured. The elements having glass-forming abilities or compounds thereof effective as the dopants used in the invention may be various substances disclosed in, for instance, R. H. Doremus, Glass Science, Wiley (1973) and Minoru IMAOKA, The Glass Handbook, p. 880, Asakura Book-Publishing Company (1975), with B, Si, Ge, P, V, Sb, Zr and Ti being particularly preferred because of their strong glass-forming ability. More specifically, most of these elements have atomic radii of not more than 1.3Å and electronegativities ranging from 1.8 to 2.1 (i.e., small difference in electronegativity between these elements and oxygen (electronegativity=3.5)) and accordingly, have low degrees of ionic bond with oxygen atom in the compound oxide on the order of not more than 50%. The elements having glass-forming abilities contribute to stabilization of the capacities of the resulting batteries and improvement of the cycle properties thereof through change in crystalline structures of the active materials and formation of a flexible lattice structure favorable for the diffusion of Li.

Moreover, the second trace dopant has an atomic radius (for instance, Ge has an atomic radius of 1.23Å) approximately equal to the transition metals such as Co, Ni and Mn and accordingly, it would be believed that the dopant replaces the metals in the $LiMO_2$ structure to thus form a partial network structure of, for instance, $GeO_2$. This network structure seems to contribute to the stabilization of capacity and the improvement in cycle properties, through the formation of a soft field favorable for the diffusion of Li. If J represents Ge, the element Ge contributes to the improvement in cycle properties of the resulting battery through addition thereof to a positive electrode essentially comprising $LiCoO_2$, $LiNiO_2$ or $LiMn_2O_4$. In this case, the optimum such effect is observed when the element is added to $LiCoO_2$. In this case, therefore, the positive electrode-active material preferably used in the invention has a composition represented by the formula: $Li_xCo_zGe_mO_p$.

Moreover, Ti seems to contribute to stabilize the voltage (or improve the cycle properties) of the resulting secondary battery.

The concentration of the dopant effective for the improvement of the battery quality is limited to the following range. In other words, $0 \leq y \leq 0.2$ for A (Na and/or K) and $0.01 \leq m \leq 0.2$ for J, in the structure represented by the foregoing formula: $Li_xA_yM_zJ_mO_p$. If the fractions of added A and J each exceeds 0.2, the capacity of the resulting battery is reduced and accordingly, the addition thereof is ineffective for the improvement of the battery quality. More preferred ranges of these components are as follows: $0.02 \leq y \leq 0.1$ and $0.02 \leq m \leq 0.10$ respectively, for the foregoing first and third embodiments of the invention.

The positive electrode-active material used in the invention preferably comprises secondary particles having an average particle size of not less than 0.1µ and not more than 15µ formed through assemblage of primary particles having an average-particle size of not less than 0.01µ and not more than 5.0µ, more preferably assembled primary particles having an average particle size of not less than 1µ and not more than 9.5 µ formed through assemblage of primary particles having an average particle size of not less than 0.1µ and not more than 2.5µ and most preferably assembled primary particles having an average particle size of not less than 3.5µ and not more than 9.5µ formed through assemblage of primary particles having an average particle size of not less than 0.1µ and not more than 2.5µ. Moreover, assembled primary particles having a particle size of not less than 1µ and not more than 15µ occupy not less than 80%, more preferably not less than 85% and most preferably not less than 90% of the whole volume of the foregoing assembled primary particles. The term "average-particle size" herein used means the mode diameter representing the highest frequency-point. More specifically, the term means an averaged value determined by visually observing particles on an electron micrograph for primary particles, and the value determined by a device for determining particle size distribution for assembled primary particles.

The specific surface area of the active material in the positive electrode is preferably greater than $0.1 \text{ m}^2/\text{g}$ and not more than $25 \text{ m}^2/\text{g}$, more preferably greater than $0.1 \text{ m}^2/\text{g}$ and not more than $5 \text{ m}^2/\text{g}$ and most preferably greater than $0.1 \text{ m}^2/\text{g}$ and not more than $3 \text{ m}^2/\text{g}$.

The present invention utilizes an active material capable of absorbing and releasing lithium ions as a negative electrode-active material. The active material is preferably an alkali metal or an alloy thereof, a carbonaceous material, or a lithium atom-containing transition metal oxide represented by the following general formula: $Li_pMO_r$ (wherein M represents a transition metal at least one of which is a member selected from the group consisting of Ti, V, Mn, Co, Fe, Nb and Mo; p ranges from 0 to 3.1 and r ranges from 1.6 to 4.1). Examples of the alkali metals or alloys thereof are Li metal, Li-Al alloys, Li-Mg alloys, Li-Al-Ni alloys and Li-Al-Mn alloys, with the use of Li metal and Li-Al alloys being effective. Examples of the carbonaceous materials usable herein are graphite, naturally-occurring graphite and artificially synthesized graphite.

Examples of preferred lithium atom-containing transition metal oxides used as materials for negative electrodes include those represented by the formula: $Li_pM_{1q1}M_{2q2}Mn_{qn}O_r$ (wherein M represents a transition metal at least one of which is a member selected from the group consisting of Ti, V, Mn, Co, Ni and Fe; p=0 to 3.1; $q1+q2+\ldots+qn=1$; n=1 to 10; and r=1.6 to 4.1). Examples of more preferred lithium atom-containing transition metal oxides used as materials for negative electrodes include those represented by the formula: $Li_pCo_qV_{1-q}O_r$, $Li_pNi_qV_{1-q}O_r$ (wherein p=0.3 to 2.2; q= 0.02 to 0.7; and r=1.5 to 2.5). Examples of most preferred lithium atom-containing transition metal oxides include those represented by the formula: $Li_pCoVO_4$ and $Li_pNiVO_4$ (wherein p=0.3 to 2.2). Preferred materials for negative electrodes second to the foregoing lithium atom-containing transition metal oxides are carbonaceous materials because of low lithium separation.

In the secondary battery of the present invention, it is preferred that the active materials for positive and negative electrodes preferably have compositional formulas different from one another. The active materials for positive and negative electrodes used in the invention can be provided through combination of compounds whose standard oxidation-reduction potentials differ from one another. For this reason, the secondary battery of the invention essentially differs from those which make use of a combination of active materials converted into "non-polar materials incapable of differentiating the positive electrode from the negative electrode" as disclosed in, for instance, J.P. KOKAI No. Hei 1- 120765.

The active materials for positive and negative electrodes used in the invention can be prepared by uniformly mixing desired starting materials (such as oxides and/or carbonates of required elements) and firing the resulting mixture, for instance, in the air, or by subjecting these starting materials to a solution reaction, with the firing method being preferred. The firing temperature ranges from 400° to 1500° C., preferably 700° to 1000° C. and the firing time preferably ranges from 4 to 48 hours, more preferably 6 to 20 hours and most preferably 6 to 15 hours. The firing-gas atmosphere used in the invention is not restricted to a specific one, but preferably air or a gas having a high oxygen content (for instance, a gas having an oxygen content of not less than about 30%) for the positive electrode-active material; and air, a gas having a low oxygen content (for instance, a gas having an oxygen content of not more than about 10%) or an inert gas such as nitrogen gas or argon gas for the negative electrode-active material. The positive electrode-active material used in the invention is formed into a positive electrode having a desired shape by, for instance, a method comprising mixing and firing a lithium compound and a transition metal compound; or a method comprising firing the mixture and then washing the fired mixture with, for instance, water and/or methanol.

The active materials for positive and negative electrodes used in the invention are preferably prepared by firing a mixture of a lithium compound and a transition metal compound listed below. Examples of the lithium compounds are oxides, salts with oxyacids and halides. Examples of the transition metal compounds used herein are oxides, salts and complex salts of transition metals having a valency of 1 to 6.

Specific examples of preferred lithium compounds used in the active materials include lithium hydroxide, lithium oxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethane sulfonate, lithium hexafluorophosphate, lithium fluoride, lithium chloride, lithium bromide and lithiu m iodide.

Moreover, specific examples of preferred transition metal compounds and compounds of glass-forming elements are $TiO_2$ (rutile or anatase type ones), lithium titanate, acetylacetonatotitanyl, titanium tetrachloride, titanium tetraiodide, ammonium titanyl oxalate, $VO_d$ (d=2 to 2.5; vanadium pentoxide corresponds to d=2.5), lithium atom-containing $VO_d$ compounds, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, chromium acetylacetonate, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, manganese acetylacetonate, iron oxide (divalent and trivalent), tri-iron tetroxide, iron hydroxide (divalent and trivalent), iron choride (divalent and trivalent), iron bromide (divalent and trivalent), iron iodide (divalent and trivalent), iron sulfate (divalent and trivalent), ammonium iron sulfate (divalent and trivalent), iron nitrate (divalent and trivalent), iron phosphate (divalent and trivalent), iron perchlorate, iron chlorate, iron acetate (divalent and trivalent), iron citrate (divalent and trivalent), ammonium iron citrate (divalent and trivalent), iron oxalate (divalent and trivalent), ammonium iron oxalate (divalent and trivalent), CoO, $Co_2O_3$, $Co_3O_4$, $LiCoO_2$, cobalt carbonate, basic cobalt carbonate, cobalt hydroxide, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexamminecobalt complex salts (salts include, for instance, sulfate, nitrate, perchlorate, thiocyanate, oxalate, acetate, fluoride, chloride, bromide, iodide), nickel oxide, nickel hydroxide, nickel carbonate, basic nickel carbonate, nickel sulfate, nickel nitrate, nickel fluoride, nickel chloride, nickel bromide, nickel iodide, nickel formate, nickel acetate, nickel acetylacetonate, copper oxides (monovalent and divalent), copper hydroxide, copper sulfate, copper nitrate, copper phosphate, copper fluoride, copper chloride, ammonium copper chloride, copper bromide, coper iodide, copper formate, copper acetate, copper oxalate, copper citrate, niobium oxychloride, niobium pentachloride, niobium pentaiodide, niobium monooxide, niobium dioxide, niobium trioxide, niobium pentoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium molybdophosphate, molybdenum oxide acetylacetonate, $WO_2$, $WO_3$, tungstic acid, ammonium tungstate and ammonium tungstophosphate; $P_2O_5$, $V_2O_5$; elemental Ge, $GeO_2$, $Ge(OH)_2$, $GeS_2$, $Ge(OH)_4$, $Ge(NH)_2$ and $Li_4GeO_4$; $SiO_2$, SiO, $B_2O_3$, $Sb_2O_3$, $SbCl_3$, $ZrO_2$ and ZrN.

Particularly preferred transition metal compounds usable in the preparation of the positive electrode-active materials used in the invention are, for instance, $MnO_2$, $Mn_2O_3$, manganese hydroxide, manganese carbonate, manganese nitrate, ammonium manganese sulfate, manganese acetate, manganese oxalate, manganese citrate, CoO, $Co_2O_3$, $Co_3O_4$, $LiCoO_2$, cobalt carbonate, basic cobalt carbonate, cobalt hydroxide, cobalt oxalate, cobalt acetate, nickel oxide, nickel hydroxide, nickel carbonate, basic nickel carbonate, nickel sulfate, nickel nitrate and nickel acetate.

Particularly preferred combinations of lithium compounds with transition metal compounds include, for instance, those of lithium hydroxide, lithium carbonate and/or lithium acetate with $MnO_2$, $Mn_2O_3$, manganese hydroxide, manganese carbonate, manganese nitrate, CoO, $Co_2O_3$, $Co_3O_4$, $LiCoO_2$, cobalt carbonate, basic cobalt carbonate, cobalt hydroxide, cobalt sulfate, cobalt nitrate, nickel oxide, nickel hydroxide, nickel carbonate, basis nickel carbonate, nickel sulfate, nickel nitrate and/or nickel acetate.

The positive electrode-active material is prepared by mixing the first and second trace dopants such as Na and/or K; and P, V, Si and/or B with the foregoing lithium compounds and the transition metal compounds and then firing the resulting mixture.

The negative electrode-active materials used in the invention can be obtained by chemically incorporating lithium ions into an active material precursor for negative electrode comprising a transition metal oxide and/or a lithium atom-containing transition metal oxide. For instance, the active material precursor for negative electrode is preferably prepared by reacting the precursor with elemental lithium, a lithium alloy or butyl lithium or electrochemically introducing lithium ions into the precursor. It is particularly preferred, in the present invention, to electrochemically introduce lithium ions into the transition metal oxide as the negative electrode-active material precursor. Most preferably, lithium ions are electrochemically introduced into the lithium atom-containing transition metal oxide as the negative electrode-active material. The electrochemical introduction of lithium ions thereinto can be performed by inducing discharges in an oxidation-reduction system (for instance, an open system (electrolysis) or a closed system (cell)) consisting of a non-aqueous electrolyte comprising a lithium atom-containing transition metal compound (i.e., the active material precursor for negative electrode herein used) as a positive electrode-active material and an elemental lithium and/or a lithium salt as the negative electrode-active material. As another embodiment which is most preferred in the invention, lithium ions are introduced by inducing discharges in an oxidation-reduction system (for instance, an open system (electrolysis) or a closed system (cell)) consisting of a non-aqueous electrolyte comprising a lithium atom-containing transition metal compound as the positive electrode-active material, an active material precursor for negative electrode having a compositional formula different from that of the positive electrode-active material and a lithium salt.

The amount of lithium ions to be introduced is not restricted to a specific range, but preferably ranges from 27 to 1340 mAh (corresponding to 1 to 50 mM), in particular 40 to 1070 mAh (corresponding to 1.5 to 40 mM) and most preferably 54 to 938 mAh (corresponding to 2 to 35 mM) per 1 g of the active material precursor for negative electrode. The cut-off voltages during charge-discharge cycles vary depending on the kinds and combinations of the active materials for positive and negative electrodes used and accordingly are not unconditionally determined, but preferably set at a level which ensures a high discharge voltage and can substantially hold desired cycle properties.

The structure of the compound obtained through firing according to the method of the present invention is analyzed by the X-ray crystallographic diffraction spectroscopy and the chemical formula thereof is evaluated by the inductively coupled plasma (IPC) emission spectroscopic analysis or by determining the difference between the weights of the powdery substance determined before and after the firing, as a simplified method.

The oxides of the positive electrode-active materials used in the present invention may be in a crystalline or amorphous state.

1. $Li_{1.05}Co_{1.0}Ge_{0.03}O_{2.09}$
2. $Li_{1.1}Co_{1.0}Ge_{0.03}O_{2.11}$
3. $Li_{0.95}Co_{1.0}Ge_{0.03}O_{2.04}$
4. $Li_{1.05}Co_{0.9}Ge_{0.03}O_{2.00}$
5. $Li_{1.05}Co_{0.95}Ge_{0.05}O_{2.05}$
6. $Li_{1.05}Co_{1.0}Ge_{0.08}O_{2.19}$
7. $Li_{1.05}Co_{1.0}Ge_{0.15}O_{2.33}$
8. $Li_{1.05}Ni_{1.0}Ge_{0.03}O_{2.09}$
9. $Li_{1.05}Ni_{1.0}Ge_{0.06}O_{2.15}$
10. $Li_{1.00}Mn_{2.0}Ge_{0.03}O_{4.06}$
11. $Li_{1.00}Mn_{2.0}Ge_{0.06}O_{4.12}$

Examples of the negative electrode-active materials which may be simultaneously used in the invention are elemental lithium and lithium alloys (such as Al, Al-Mn (U.S. Pat. No. 4,820,599), Al-Mg (J.P. KOKAI No. Sho 57-98977), Al-Sn (J.P. KOKAI No. Sho 63-6742), Al-In and Al-Cd (J.P. KOKAI No. Hei 1- 144573) alloys) as well as fired carbonaceous compounds capable of absorbing and releasing lithium ions or elemental lithium (such as those disclosed in, for instance, J.P. KOKAI Nos. Sho 58-209864, Sho 61-214417, Sho 62-88269, Sho 62-216170, Sho 63-13282, Sho 63-24555, Sho 63-121247, Sho 63-121257, Sho 63- 155568, Sho 63-276873, Sho 63-314821, Hei 1-204361, Hei 1- 221859 and Hei 1-274360). The foregoing elemental lithium or lithium compounds are not simultaneously used for making use of dissolution/precipitation reaction of, for instance, elemental lithium, but are used simultaneously for the introduction of lithium ions into the secondary battery.

Additives such as conductivity-imparting agents, binders and fillers may be added to a depolarizing mix for electrode. The conductivity-imparting agents may be any electron-conductive materials so far as they do not cause any chemical change in the assembled secondary battery. In general, the depolarizing mix may comprise at least one conductivity-imparting agent selected from the group consisting of, for instance, naturally-occurring graphite (for instance, scaly graphite, flaky graphite and muddy graphite), artificial graphite, carbon black, acetylene black, Ketchen black, carbon fibers, powdery metals (such as copper, nickel, aluminum, silver (see J.P. KOKAI No. Sho 63-148554)), metal fibers or polyphenylene derivatives (see J.P. KOKAI No. Sho 59-20971), with simultaneous use of graphite and acetylene black being particularly preferred. The amount thereof is not limited to a particular range, but preferably ranges from 1 to 50% by weight and in particular, 2 to 30% by weight. If carbon or graphite is used, particularly preferred amount thereof ranges from 2 to 15% by weight.

Examples of binders usually used are starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymer (EPDM), sulfonated EPDM, styrene-butadiene rubber, polybutadiene, fluororubber, polyethylene oxide, polysaccharides, thermoplastic resins, polymers exhibiting rubber elasticity and mixture thereof. In this respect, if a compound having a functional group reactive with lithium such as a polysaccharide is used, the functional group is preferably deactivated through addition of a compound having, for instance, an isocyanate group. The amount of the binder is not limited to a specific range, but preferably ranges from 1 to 50% by weight and in particular, 2 to 30% by weight. The filler may be any fibrous materials so far as they do not undergo any chemical change in the assembled secondary battery. Examples of the fillers usually employed are olefinic polymers such as polypropylene and polyethylene and fibers of, for instance, glass and carbon. The amount of the filler is not restricted to a specific range, but preferably ranges from 0 to 30% by weight.

The electrolyte used in the invention comprises at least one aprotic organic solvent selected from the group consisting of propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester (J.P. KOKAI No. Sho 60-23973), trimethoxymethane (J.P. KOKAI No. Sho 61-4170), dioxolane derivatives (J.P. KOKAI Nos. Sho 62-15771, Sho 62-22372 and Sho 62-108474), sulfolane (J.P. KOKAI No. Sho 62-31959), 3-methyl-2-oxazolidinone (J.P. KOKAI No. Sho 62-44961), propylene carbonate derivatives (J.P. KOKAI Nos. Sho 62-290069 and Sho 62-290071), tetrahydrofuran derivatives (J.P. KOKAI No. Sho 63-32872), diethyl ether (J.P. KOKAI No. Sho 63-62166) and 1,3-propanesultone (J.P. KOKAI No. Sho 63-102173); and at least one lithium salt soluble in the solvent selected from the group consisting of, for instance, $LiClO_4$, $LiBF_4$, $LiPF_6$, $LiCF_3SO_3$, $LiCF_3CO_2$, $LiAsF_6$, $LiSbF_6$, $LiB_{10}Cl_{10}$ (J.P. KOKAI No. Sho 57- 74974), lithium lower aliphatic carboxylates (J.P. KOKAI No. Sho 60-41773), $LiAlCl_4$, LiCl, LiBr, LiI (J.P. KOKAI No. Sho 60- 247265), chloroborane lithium salt (J.P. KOKAI No. Sho 61 - 165957) and lithium tetraphenyl borate (J.P. KOKAI No. Sho 61- 214376). Among these, preferred are those comprising a mixture of propylene carbonate or ethylene carbonate with 1,2-dimethoxyethane and/or diethyl carbonate as a solvent and $LiCF_3SO_3$, $LiClO_4$, $LiBF_4$ and/or $LiPF_6$ as electrolytes. The amount of these electrolytes to be incorporated into the secondary battery is not restricted to a particular range and can properly be selected depending on the amounts of the active materials for positive and negative electrodes and the desired size of the secondary battery. The volume ratio of the solvents used is not limited to a specific level, but preferably ranges from 0.4/0.6 to 0.6/0.4 in case of a mixture of propylene carbonate or ethylene carbonate with 1,2-dimethoxyethane and/or diethyl carbonate (when both 1,2-dimethoxyethane and diethyl carbonate are used, the mixing ratio of the former to the latter ranges from 0.4/0.6 to 0.6/0.4). The concentration of the supporting electrolyte is not likewise limited to a specific range, but preferably ranges from 0.2 to 3 moles per one liter of the electrolyte.

Solid electrolytes such as those listed below can likewise be used in place of the foregoing electrolyte solutions. The solid electrolytes can roughly be divided into two groups, i.e., inorganic solid electrolytes and organic solid electrolytes. Well-known inorganic solid electrolytes include, for instance, lithium nitride, halides and salts with oxyacids. Among these, effectively used are, for instance, $Li_3N$, LiI, $Li_5NI_2$, $Li_3N$-LiI-LiOH, $LiSiO_4$, $LiSiO_4$-LiI-LiOH (J.P. KOKAI No. Sho 49-81899), $xLi_3PO_4$-$(1-x)Li_4SiO_4$(J.P. KOKAI No. Sho 59-60866), $Li_2SiS_3$(J.P. KOKAI No. Sho 60-501731) and phosphorus sulfide compounds (J.P. KOKAI No. Sho 62-82665). On the other hand, examples of effective organic solid electrolytes are polyethylene oxide derivatives or polymers comprising the derivatives (J.P. KOKAI No. Sho 63-135447), polypropylene oxide derivatives or polymers comprising the derivatives, ionized group-containing polymers (J.P. KOKAI Nos. Sho 62-254302, Sho 62-254303 and Sho 63- 193954), mixtures of ionized group-containing polymers with the foregoing aprotic electrolyte solutions (U.S. Pat. Nos. 4,792,504 and 4,830,939 and J.P. KOKAI Nos. Sho 62-22375, Sho 62-22376, Sho 63-22375, Sho 63-22776 and Hei 1-95117) and polymers of phosphoric acid esters (J.P. KOKAI No. Sho 61- 256573). Moreover, polyacrylonitrile may be added to the electrolyte solution (J.P. KOKAI No. Sho 62-278774). It is also known to simultaneously use these inorganic and organic solid electrolytes (J.P. KOKAI No. Sho 60-1768).

The separator herein used is an insulating thin film having a high permeability to ions and a desired mechanical strength. There are used, for instance, sheets and nonwoven fabrics produced from olefinic polymers such as polypropylene, glass fibers or polyethylene because of their high resistance to organic solvents and high hydrophobicity. The pore size of the separator falls within the range generally used in the field of batteries, for instance, ranges from 0.01 to 10 µm. The thickness of the separator likewise falls within the range generally used in the field of batteries, for instance, ranges from 5 to 300 µm.

It has been known that compounds listed below are added to the electrolyte used in the invention for the improvement of the discharge and charge-discharge properties of the resulting battery. Examples of such compounds are pyridine (J.P. KOKAI No. Sho 49-108525), triethylphosphite (J.P. KOKAI No. Sho 47-4376), triethanolamine (J.P. KOKAI No. Sho 52-72425), cyclic ethers (J.P. KOKAI No. Sho 57-152684), ethylenediamine (J.P. KOKAI No. Sho 58-87777), n-glyme (J.P. KOKAI No. Sho 58-87778), hexaphosphoric acid triamide (J.P. KOKAI No. Sho 58-87779), nitrobenzene derivatives (J.P. KOKAI No. Sho 58-214281), sulfur (J.P. KOKAI No. Sho 59-8280), quinoneimine dyes (J.P. KOKAI No. Sho 59-68184), N-substituted oxazolidinone and N,N'-substituted imidazolidinone (J.P. KOKAI No. Sho 59-154778), ethylene glycol dialkyl ether (J.P. KOKAI No. Sho 59-205167), quaternary ammonium salts (J.P. KOKAI No. Sho 60-30065), polyethylene glycol (J.P. KOKAI No. Sho 60-41773), pyrrole (J.P. KOKAI No. Sho 60-79677), 2-methoxyethanol (J.P. KOKAI No. Sho 60-89075), $AlCl_3$ (J.P. KOKAI No. Sho 61-88466), monomers of conductive polymer electrode-active materials (J.P. KOKAI No. Sho 61- 161673), triethylenephosphoramide (J.P. KOKAI No. Sho 61- 208758), trialkyl phosphines (J.P. KOKAI No. Sho 62-80976), morpholine (J.P. KOKAI No. Sho 62-80977), carbonyl group-containing aryl compounds (J.P. KOKAI No. Sho 62-86673), hexamethylphosphoric triamide and 4-alkylmorpholine (J.P. KOKAI No. Sho 62-217575), dicyclic tertiary amines (J.P. KOKAI No. Sho 62-217578), oils (J.P. KOKAI No. Sho 62-287580), quaternary phosphonium salts (J.P. KOKAI No. Sho 63-121268) and tertiary sulfonium salts (J.P. KOKAI No. Sho 63-121269).

The electrolyte may comprise a halogen atom-containing solvent such as carbon tetrachloride and ethylene trifluorochloride for making the electrolyte flame retardant(J. P. KOKAI No. Sho 48-36632). Moreover, carbon dioxide gas ma y be added to the electrolyte for imparting high temperature storability thereto (J.P. KOKAI No. Sho 59-134567).

In addition, the depolarizing mixes for positive and negative electrodes may comprise an electrolyte solution or an electrolyte. There have been known, for instance, the foregoing ion-conductive polymers and nitromethane (J.P. KOKAI No. Sho 48-36633) and electrolyte solutions (J.P. KOKAI No. Sho 57-124870).

Moreover, the positive electrode-active material may be subjected to a surface-modification treatment, for instance, a treatment of the surface of a metal oxide with an esterifying agent (J.P. KOKAI No. Sho 55-163779), a treatment thereof with a chelating agent (J.P. KOKAI No. Sho 55-163780) and treatments thereof with, for instance, conductive polymers (J.P. KOKAI Nos. Sho 58-163188 and Sho 59-14274) and polyethylene oxide (J.P. KOKAI Nos. Sho 60-97561). In addition, the negative electrode-active material may also be subjected to a surface-modification treatment, for instance, application of a layer of an ion-conductive polymer or polyacetylene (J.P. KOKAI No. Sho 58- 111276) or a treatment with LiCl (J.P. KOKAI No. Sho 58-142771).

A current collector for the electrode-active material may be all kinds of electron-conductors so far as they do not undergo any chemical change in the assembled battery. Examples of materials for these current collectors include stainless steel, nickel, aluminum, titanium, calcined carbon, or aluminum or stainless steel which is surface treated with carbon, nickel, titanium or silver for positive electrodes; and stainless steel, nickel, copper, titanium, aluminum, calcined carbon, or copper or stainless steel which is surface treated with carbon, nickel, titanium or silver, or Al-Cd alloys for negative electrodes. The surface of these materials may be oxidized. The current collector may have a variety of shapes such as a foil, film, sheet, net, punched foil, film, sheet or net, lath, porous bodies, foams or molded article of fibers. The thickness thereof is not particularly limited, but generally ranges from 1 to 500 µm.

The battery may have any shape such as a coin, button, sheet, cylinder or square. In the coin or button-like battery, the depolarizing mixes for the positive and negative electrode-active materials are pressed into pellets and these pellets are put into practical use. The thickness and diameter of these pellets are determined depending on the size of each specific battery. In case of sheet-like, cylindrical or square batteries, the depolarizing mixes for the positive and negative electrode-active materials each is coated on a current collector, dried or dehydrated, pressed and then put into practical use. In particular, the thickness of the coated layer as determined after drying and pressing preferably ranges from 1 to 2000 µm. These pellets and sheets are dried or dehydrated by methods generally used, in particular, vacuum drying, infrared drying, far infrared drying, electron radiation drying and low humidity-air drying which may be used alone or in combination. The drying or dehydration temperature preferably ranges from 80° to 350° C. and in particular 100° to 250° C. The pellets and sheet may be pressed by any method commonly used, in particular, by pressing in a mold or calender-pressing. The pressure for the pressing is not critical, but preferably ranges from 0.2 to 3 t/cm$^2$. The pressing speed in the calender-pressing method preferably ranges from 1 to 50 m/min. The pressing temperature preferably ranges from room temperature to 200° C. The sheet of the mix is introduced into a can after folding or rolling to thus establish electrical connection between the can and the sheet, followed by injection of an electrolyte and sealing with a cover plate to give a battery can. In this respect, a safety valve can be used instead of the sealing cover. The can and lead plates may be produced from electrically conductive metals and alloys. For instance, they are produced from metals such as iron, nickel, titanium, chromium, molybdenum, copper and aluminum and alloys thereof. Sealing agents for sealing the battery may be conventionally known compounds and mixture such as asphalt.

As has been discussed above in detail, the positive electrode-active material according to the present invention permits the production of nonaqueous electrolyte lithium type secondary batteries having excellent charge-discharge characteristics, discharge voltages and cycle properties.

The present invention will hereunder be explained in more detail with reference to the following Examples, but the present invention is not restricted to these specific Examples and the effects practically attained by the present invention will likewise be discussed in detail below in comparison with Comparative Examples.

EXAMPLE 1

Electrode-Depolarizing Mix, Production of Coin Battery and Charge-Discharge Test The material for the positive electrode herein used was prepared by mixing 82% by weight of a positive electrode-active material, 12% by weight of scaly graphite as a conductivity-imparting agent and 6% by weight of tetrafluoroethylene as a binder to give a positive electrode-depolarizing mix, compression-molding the mix into positive electrode-pellets (13 mm ø, 0.06 g) and then sufficiently dehydrating and drying, over not less than 2 hours, the pellets in a dry box (supplied with dried air; dew point ranging from −40° to −70° C.) placed on a far infrared heater. The material for the negative electrode herein used was a lithium/aluminum alloy (thickness: 0.7 mm; 15 mm ø; 0.066 g). A net of SUS 316 having a thickness of 80 µ m was used as a current collector which was welded to positive and negative electrode cans for the coin battery. An electrolyte was prepared by dissolving LiPF$_6$ in 1:1 (volume ratio) mixture of ethylene carbonate and diethyl carbonate in a concentration of 1 mole/l and a separator comprising a microporous polypropylene sheet and a polypropylene nonwoven fabric was impregnated with 250 µl of the electrolyte. The positive and negative electrode-materials were put on the current collectors and the separator was inserted between the positive and negative electrode-materials, the positive and negative electrode cans were engaged with one another by a caulking device in a dry box to give a coin-shaped lithium ion battery. The lithium ion battery was subjected to a charge-discharge test at a current density of 1.0 mA/cm$^2$. The tests were all initiated from discharge. The charge-discharge cycle properties were evaluated by carrying out charge-discharge cycles between 4.5 V and 3.0 V, in other words, the cut-off voltages for charging and discharging were set at 4.5 V and 3.0 V, respectively.

Preparation of Active Materials

Comparative Sample-1

Lithium carbonate and cobalt carbonate were mixed in an atomic ratio of lithium to cobalt of 1.2:1.0, fired at 800° C. for 10 hours in the air and cooled at a rate of 3° C./min to give $Li_{1.2}CoO_{2.1}$.

Comparative Sample-2

Lithium carbonate, sodium carbonate and cobalt carbonate were mixed in an atomic ratio: lithium/sodium/cobalt of 1.1:0.1:1.0, fired at 800° C. for 10 hours in the air and cooled at a rate of 3° C./min to give $Li_{1.1}Na_{0.1}CoO_{2.1}$.

Comparative Sample-3

Lithium carbonate, cobalt carbonate and phosphorus pentoxide were mixed in an atomic ratio: lithium/cobalt/phosphorus of 1.2:1:0.05, fired at 900° C. for 6 hours in the air and cooled at a rate of 3° C./min to give $Li_{1.2}Co_{0.95}P_{0.05}O_{2.1}$. These comparative samples were formed into pellets according to the foregoing method and incorporated into coin-shaped batteries as positive electrode-pellets. The resulting batteries were subjected to charge-discharge tests.

The samples according to the present invention were prepared by mixing, in an automatic mortar, lithium carbonate, sodium carbonate, cobalt carbonate and phosphorus pentoxide in an atomic ratio: Li:Na:Co:P falling within the range defined below, firing at 800° C. for 10 hours in the air, then cooling at a rate of 3° C./min to give compound oxides each comprising these 4 elements. The presence of sodium and titanium in the structure of each resulting compound oxide as dopants was confirmed by the fact that the X-ray diffraction pattern did not include any peak which could be ascribed to the oxides of sodium and titanium and corresponded to the presence of free oxides of these elements as impurities and by the fact that atomic-absorption spectroscopic analysis and ICP emission spectroscopic analysis of each sample exhibited peaks showing the presence of these metals.

Composition of Positive Electrode-Active Materials

Comparative Sample 1: $Li_{1.2}Co_{1.0}O_{2.1}$
Comparative Sample 2: $Li_{1.1}Na_{0.1}Co_{1.0}O_{2.1}$
Comparative Sample 3: $Li_{1.2}Co_{0.95}P_{0.05}O_2$ Present Invention 1: $Li_{1.05}Na_{0.15}Co_{0.92}P_{0.08}O_{2.1}$
Present Invention 2: $Li_{1.1}Na_{0.1}Co_{0.95}P_{0.05}O_{2.1}$
Present Invention 3: $Li_{1.12}Na_{0.08}Co_{0.95}P_{0.05}O_{2.1}$
Present Invention 4: $Li_{1.12}Na_{0.08}Co_{0.97}P_{0.03}O_{2.1}$
Present Invention 5: $Li_{1.16}Na_{0.04}CO_{0.97}P_{0.03}O_{2.1}$ The charge-discharge characteristics and the cycle properties of the foregoing samples were evaluated and summarized in the following Table 1. The results shown in Table 1 clearly indicate that the samples obtained by adding either Na as an alkali metal or P as a non-transition metal to the active material having a composition: $LiCoO_2$ (comparative samples 2 and 3) suffer from a problem of a decrease in the initial capacity or the capacity during charge-discharge cycles, while the systems simultaneously comprising these two components exhibited stabilization of the capacity during charge-discharge cycles and the discharge voltage, i.e., these systems were substantially improved in the charge-discharge characteristics.

EXAMPLE 2

A coin battery was produced by repeating the same procedures used in Example 1 except that a common negative electrode, which was substituted for the negative electrode material (Li/Al) used in Example 1, was produced by mixing 82% by weight of $LiCoVO_4$ as the lithium atom-containing transition metal compound, 12% by weight of scaly graphite as a conductivity-imparting agent and 6% by weight of polyvinylidene fluoride as a binder to give a depolarizing mix, compression-molding the mix into pellets (13 mm ø, 0.060 g) for negative electrode and sufficiently drying the pellets contained in a dry box by a far infrared heater. Then the charge-discharge characteristics and the cycle properties thereof were evaluated in the same manner used in Example 1.

As a result, it was confirmed that the overall cycle properties of the discharge capacity of the battery were inferior to that of the battery in which Li/Al was used as the negative electrode. However, the superiority of the positive electrode-active material having the composition defined by the present invention was confirmed since the effect of the simultaneous addition of P and Na was almost identical to that listed in Table 1, i.e., there was observed improvement in the cycle properties (stabilization of both voltage and capacity) as compared with the comparative samples.

EXAMPLE 3

A variety of compound oxides having the following compositions were prepared according to the same procedures used in Example 1 except that manganese dioxide or nickel carbonate was substituted for cobalt carbonate used in Example 1 and firing was carried out at a temperature ranging from 500° to 900 ° C. for 6 to 10 hours.

Composition of Positive Electrode-Active Materials

Present Invention 6: $Li_{1.1}Na_{0.1}Mn_{1.92}P_{0.08}O_{4.1}$
Present Invention 7: $Li_{1.1}Na_{0.1}Mn_{1.95}P_{0.05}O_{4.1}$
Present Invention 8: $Li_{1.15}Na_{0.05}Mn_{1.92}P_{0.08}O_{4.1}$
Present Invention 9: $Li_{1.15}Na_{0.05}Mn_{1.95}P_{0.05}O_{4.1}$
Present Invention 10: $Li_{1.06}Na_{0.04}Mn_{1.97}P_{0.03}O_{4.1}$
Present Invention 11: $Li_{1.1}Na_{0.1}Ni_{0.92}P_{0.08}O_{2.1}$
Present Invention 12: $Li_{1.1}Na_{0.1}Ni_{0.95}P_{0.05}O_{2.1}$
Present Invention 13: $Li_{1.15}Na_{0.05}Ni_{0.92}P_{0.08}O_{2.1}$
Present Invention 14: $Li_{1.15}Na_{0.05}Ni_{0.95}P_{0.05}O_{2.1}$
Present Invention 15: $Li_{1.08}K_{0.02}Co_{0.97}P_{0.03}O_{2.05}$
Present Invention 16: $Li_{1.08}K_{0.02}Mn_{1.97}P_{0.03}O_{4.05}$
Present Invention 17: $Li_{1.08}K_{0.02}Ni_{0.97}P_{0.03}O_{2.05}$ Coin batteries were produced using the foregoing pellets of the active material as positive electrodes and Li/Al as negative electrodes like the battery of Example 1 and the charge-discharge characteristics thereof were evaluated in the same manner. As a result, all of the samples of the present invention were improved in the cycle properties, in particular, in the voltage stability as compared with the comparative samples to which either an alkali metal (Na or K) or P was added. Marked improvement in the cycle properties was observed, in particular, in the systems to which not more than 5% of Na or K and not more than 5% of P were added. Moreover, the effects attained by Co, Mn, Ni as the main transition metal component in the structural formula are compared with one another (inclusive of the results listed in Table 1) and as a result, it is found that the optimum effect of the invention is achieved through the use of Co.

It can be concluded, from the foregoing experimental results, that particularly excellent battery quality and cycle properties would be expected when in the general formula: $Li_xA_yM_zJ_mO_p$, A is Na and M is Co and when the amounts thereof fall within the ranges: $0.02 \leq y \leq 0.1$ and $0.02 \leq m \leq 0.10$, respectively.

EXAMPLE 4

The samples falling within the scope of the present invention were prepared by mixing, in an automatic mortar, lithium carbonate, sodium carbonate, cobalt carbonate and vanadium pentoxide in an atomic ratio: Li:Na:Co:V falling within the range defined below, firing at 800° C. for 10 hours in the air, then cooling at a rate of 3° C./min to give compound oxides each comprising these 4 elements.

Composition of Positive Electrode Active Materials

Comparative Sample 1: $Li_{1.2}Co_{1.0}O_{2.1}$
Comparative Sample 2: $Li_{1.1}Na_{0.1}Co_{1.0}O_{2.1}$
Present Invention 18: $Li_{1.05}Na_{0.15}Co_{1.0}V_{0.05}O_{2.1}$
Present Invention 19: $Li_{1.1}Na_{0.1}Co_{1.0}V_{0.05}O_{2.1}$
Present Invention 20: $Li_{1.12}Na_{0.08}Co_{1.0}V_{0.03}O_{2.1}$
Present Invention 21: $Li_{1.12}Na_{0.08}Co_{0.97}V_{0.03}O_{2.1}$ Pellets of the foregoing samples were used as positive electrode-active materials to give secondary batteries and the charge-discharge characteristics and the cycle properties thereof were evaluated and summarized in the following Table 2. The results shown in Table 2 clearly indicate that the samples obtained by adding both Na as an alkali metal and V as a glass-forming element to the active material having a composition: $LiCoO_2$ could improve the capacity-maintaining rates among the cycle properties of the resulting batteries without any reduction in the discharge voltage as compared with the comparative samples 1 and 2.

EXAMPLE 5

The samples according to the present invention were prepared by adding boron oxide, silicon oxide, germanium oxide, antimony oxide or zirconium oxide as a glass-forming compound to lithium carbonate, sodium carbonate and cobalt carbonate, then mixing them in an automatic mortar, firing at 900° C. for 6 hours in the air, then cooling at a rate of 2° C./min to give compound oxides each comprising 4 elements.

Composition of Positive Electrode Active Materials

Present Invention 22: $Li_{1.0}Na_{0.1}Co_{1.0}B_{0.06}O_{2.1}$

Present Invention 23: $Li_{1.0}Na_{0.1}Co_{0.97}B_{0.03}O_{2.1}$
Present Invention 24: $Li_{1.0}Na_{0.1}Co_{1.0}Ge_{0.10}O_{2.1}$
Present Invention 25: $Li_{1.0}Na_{0.1}Co_{1.0}Ge_{0.20}O_{2.1}$
Present Invention 26: $Li_{1.0}Na_{0.1}Co_{0.97}Si_{0.03}O_{2.1}$
Present Invention 27: $Li_{1.0}Na_{0.1}Co_{1.0}Sb_{0.05}O_{2.1}$
Present Invention 28: $Li_{1.0}Na_{0.1}Co_{1.0}Zr_{0.05}O_{2.1}$
Present Invention 29: $Li_{1.0}Na_{0.1}Co_{1.0}Zr_{0.10}O_{2.1}$ Pellets of the foregoing samples were used for the production of secondary batteries and the charge-discharge characteristics and the cycle properties thereof were evaluated and summarized in the following Table 3. The results shown in Table 3 clearly indicate that the samples obtained by adding Na as an alkali metal and B, Ge, Si or Zr as a glass-forming element to the active material having a composition: $LiCoO_2$ could provide batteries having stabilized capacities among the cycle properties as compared with the comparative samples 1 and 2 (see Table 2).

TABLE 1

| Sample No. | Discharge Capacity mAh | Average Discharge Voltage V vs. Li/Al | Capacity-Maintaining Rate (%) After 50 Cycles | Voltage-Maintaining Rate (%) After 50 Cycles |
|---|---|---|---|---|
| 1* | 9.0 | 3.90 | 67.7 | 96.0 |
| 2* | 9.0 | 3.95 | 65.4 | 87.5 |
| 3* | 8.9 | 3.90 | 67.5 | 98.8 |
| 1 | 8.9 | 3.90 | 67.8 | 99.0 |
| 2 | 9.1 | 3.95 | 75.0 | 99.8 |
| 3 | 9.2 | 4.00 | 80.3 | 99.8 |
| 4 | 9.2 | 3.96 | 80.0 | 99.7 |
| 5 | 9.1 | 3.93 | 75.7 | 99.0 |

*Comparative Sample.

TABLE 2

| Sample No. | Discharge Capacity mAh | Average Discharge Voltage V vs. Li/Al | Capacity-Maintaining Rate (%) After 50 Cycles | Voltage-Maintaining Rate (%) After 50 Cycles |
|---|---|---|---|---|
| 1* | 9.0 | 3.90 | 67.7 | 96.0 |
| 2* | 9.0 | 3.95 | 65.4 | 87.5 |
| 18 | 8.9 | 3.97 | 78.0 | 91.0 |
| 19 | 8.9 | 3.95 | 78.0 | 91.5 |
| 20 | 9.0 | 3.93 | 73.0 | 93.0 |
| 21 | 9.0 | 3.93 | 73.0 | 93.0 |

*Comparative Sample.

TABLE 3

| Sample No. | Discharge Capacity mAh | Average Discharge Voltage V vs. Li/Al | Capacity-Maintaining Rate (%) After 50 Cycles | Voltage-Maintaining Rate (%) After 50 Cycles |
|---|---|---|---|---|
| 22 | 8.5 | 3.80 | 68.0 | 85.0 |
| 23 | 8.7 | 3.83 | 69.0 | 87.5 |
| 24 | 9.0 | 3.95 | 75.0 | 95.5 |
| 25 | 9.0 | 4.00 | 77.0 | 97.5 |
| 26 | 8.8 | 3.90 | 81.0 | 97.5 |
| 27 | 8.5 | 3.85 | 77.0 | 90.0 |
| 28 | 9.0 | 3.96 | 80.0 | 99.2 |
| 29 | 9.0 | 3.93 | 81.0 | 99.3 |

EXAMPLE 6

Electrode-Depolarizing Mix, Production of Coin Battery and Charge-Discharge Test The material for the positive electrode herein used was prepared by mixing 82% by weight of a positive electrode-active material, 12% by weight of scaly graphite as a conductivity-imparting agent and 6% by weight of tetrafluoroethylene as a binder to give a positive electrode-depolarizing mix, compression-molding the mix into positive electrode-pellets (13 mm ⌀, 0.06 g) and then sufficiently dehydrating and drying, over not less than 2 hours, the pellets in a dry box (supplied with dried air; dew point ranging from −40° to −70° C.) placed on a far infrared heater. The material for the negative electrode herein used was a lithium/aluminum alloy (thickness: 0.7 mm; 15 mm ⌀; 0.066 g). A net of SUS 316 having a thickness of 80 μm was used as a current collector which was welded to positive and negative electrode cans for the coin battery. An electrolyte was prepared by dissolving LiPF6 in 1:1 (volume ratio) mixture of ethylene carbonate and diethylene carbonate in a concentration of 1 mole/l and a separator comprising a microporous polypropylene sheet and a polypropylene nonwoven fabric was impregnated with 250 μl of the electrolyte. The positive and negative electrode-materials were put on the current collectors and the separator was inserted between the positive and negative electrode-materials, the positive and negative electrode cans were engaged with one another by a caulking device in a dry box to give a coin-shaped lithium ion battery. The lithium ion battery was subjected to a charge-discharge test at a constant current density of 1.0 mA/cm². The tests were all initiated from discharge. The charge-discharge cycle properties were evaluated by carrying out charge-discharge cycles between 4.5 V and 3.0 V, in other words, the cut-off voltages for charging and discharging were set at 4.5 V and 3.0 V, respectively.

Preparation of Active Materials

Comparative Sample-i

The comparative sample 1 prepared and used in Example 1 was formed into pellets according to the foregoing method and incorporated into a coin-shaped battery as positive electrode-pellets. The resulting batteries were subjected to charge-discharge tests.

The samples according to the present invention and comparative samples (Comparative Examples ii and iii) which had Ge contents different from that of the present invention were prepared by mixing, in an automatic mortar, lithium carbonate, sodium carbonate and germanium dioxide in an atomic ratio: Li:Co:Ge falling within the range defined below, firing at 800° C. for 10 hours in the air, then cooling at a rate of 3° C./min to give Ge-containing compound oxides for use in making the positive electrode.

Composition of Positive Electrode-Active Materials

Comparative Sample i: $Li_{1.2}Co_{1.0}O_{2.1}$
Present Invention 30: $Li_{1.05}Co_{1.0}Ge_{0.03}O_{2.09}$
Present Invention 31: $Li_{1.1}Co_{1.0}Ge_{0.03}O_{2.11}$
Present Invention 32: $Li_{0.95}Co_{1.0}Ge_{0.03}O_{2.04}$
Present Invention 33: $Li_{1.05}Co_{0.95}Ge_{0.03}O_{2.00}$
Present Invention 34: $Li_{1.05}Co_{0.95}Ge_{0.05}O_{2.05}$
Present Invention 35: $Li_{1.05}Co_{1.0}Ge_{0.08}O_{2.19}$ Present Invention 36: $Li_{1.05}Co_{1.0}Ge_{0.15}O_{2.33}$
Comparative Sample ii: $Li_{1.05}Co_{1.0}Ge_{0.25}O_{2.53}$
Comparative Sample iii: $Li_{1.05}Co_{1.0}Ge_{0.30}O_{2.63}$ The charge-discharge characteristics and the cycle properties of the foregoing samples were evaluated and summarized in the following Table 4. The results shown in Table 4 clearly indicate that the samples obtained by adding Ge to the active material having a composition: $LiCoO_2$ had improved discharge voltages and cycle properties of the discharge voltage (i.e., capacity-maintaining rate). This in turn indicates that these samples were substantially improved in the charge-discharge characteristics. It is also proved that the amount of Ge preferably added for the quality-improvement ranges from 3 to 5 mole % and that, as shown in Comparative Samples ii and iii, if the added amount of Ge exceeds 20%, the capacity of the resulting battery was reduced and accordingly the intended effect of the present invention could not be achieved.

EXAMPLE 7

Simultaneous Use of Negative Electrode of Transition Metal-Compound Oxide

A coin battery was produced by repeating the same procedures used in Example 6 except that a common negative electrode, which was substituted for the negative electrode material (Li/Al) used in Example 6, was produced by mixing 82% by weight of $LiCoVO_4$ as the lithium atom-containing transition metal compound, 12% by weight of scaly graphite as a conductivity-imparting agent and 6% by weight of polyvinylidene fluoride as a binder to give a depolarizing mix, compression-molding the mix into pellets (13 mm ø, 0.060 g) for negative electrode and sufficiently drying the pellets contained in a dry box by a far infrared heater. Then the charge-discharge characteristics and the cycle properties thereof were evaluated in the same manner used in Example 6.

As a result, it was confirmed that the overall cycle properties of the discharge capacity of the battery were inferior to those of the battery in which Li/Al was used as the negative electrode. However, the superiority of the positive electrode-active material having the composition defined by the present invention was confirmed since the effect of the addition of Ge was almost identical to that listed in Table 4, i.e., there was observed improvement in the cycle properties (stabilization of both voltage and capacity) as compared with the comparative samples.

EXAMPLE 8

A variety of compound oxides having the following compositions were prepared according to the same procedures used in Example 6 except that manganese dioxide or nickel carbonate was substituted for cobalt carbonate used in Example 6 and firing was carried out at a temperature ranging from 500° to 900 ° C. for 6 to 10 hours.

Composition of Positive Electrode-Active Materials

Comparative Sample iv: $Li_{1.05}Ni_{1.0}O_{2.02}$
Comparative Sample v: $Li_{1.05}Mn_{2.0}O_{4.02}$
Present Invention 37: $Li_{1.05}Ni_{1.0}Ge_{0.03}O_{2.09}$
Present Invention 38: $Li_{1.05}Ni_{1.0}Ge_{0.06}O_{2.15}$
Present Invention 39: $Li_{1.00}Mn_{2.0}Ge_{0.03}O_{4.06}$
Present Invention 40: $Li_{1.00}Mn_{2.0}Ge_{0.06}O_{4.12}$ Coin batteries were produced using the foregoing pellets of the active material as positive electrodes and Li/Al as negative electrodes like the battery of Example 6 and the charge-discharge characteristics thereof were evaluated in the same manner. As a result, it was confirmed that the comparative samples iv and v exhibited low initial discharge capacities as compared with the comparative sample i comprising Co as the transition metal component and that the samples 37 to 40 of the present invention comprising Ge were all highly improved in the cycle properties, in particular, the stabilization of the discharge voltage as compared with the comparative samples iv and v.

TABLE 4

| Sample No. | Discharge Capacity mAh | Average Discharge Voltage V vs. Li/Al | Capacity-Maintaining Rate (%) After 50 Cycles | Voltage-Maintaining Rate (%) After 50 Cycles |
|---|---|---|---|---|
| i* | 9.0 | 3.90 | 67.7 | 96.0 |
| 30 | 9.0 | 4.02 | 75.0 | 99.2 |
| 31 | 8.9 | 4.01 | 72.0 | 99.0 |
| 32 | 9.0 | 4.02 | 75.0 | 99.0 |
| 33 | 8.8 | 4.02 | 74.0 | 99.2 |
| 34 | 8.2 | 4.00 | 75.0 | 97.0 |
| 35 | 8.0 | 3.95 | 72.0 | 97.0 |
| ii* | 6.8 | 3.90 | 70.0 | 96.5 |
| iii* | 6.5 | 3.90 | 71.0 | 96.5 |

*Comparative Sample.

EXAMPLE 9

Electrode-Depolarizing Mix, Production of Coin Battery and Charge-Discharge Test The material for the positive electrode herein used was prepared by mixing 82% by weight of a positive electrode-active material, 12% by weight of scaly graphite as a conductivity-imparting agent and 6% by weight of tetrafluoroethylene as a binder to give a positive electrode-depolarizing mix, compression-molding the mix into positive electrode-pellets (13mm ø, 0.06 g) and then sufficiently dehydrating and drying, over not less than 2 hours, the pellets in a dry box (supplied with dried air; dew point ranging from −40° to −70° C.) placed on a far infrared heater. The material for the negative electrode herein used was a lithium/aluminum alloy (thickness: 0.7 mm; 15 mm ø; 0.066 g). A net of SUS 316 having a thickness of 80 µm was used as a current collector which was welded to positive and negative electrode-cans for the coin battery. An electrolyte was prepared by dissolving $LiPF_6$ in 1:1 (volume ratio) mixture of ethylene carbonate and diethylene carbonate in a concentration of 1 mole/l and a separator comprising a microporous polypropylene sheet and a polypropylene non-woven fabric was impregnated with 250 µl of the electrolyte. The positive and negative electrode-materials were put on the current collectors and the separator was inserted between these electrode-materials, the positive and negative electrode-cans were engaged with one another by a caulking device in a dry box to give a coin-shaped lithium ion battery. The lithium ion battery was subjected to a charge-discharge test at a constant current density of 0.75 mA/cm². The tests were all initiated from discharge. The charge-discharge cycle properties were evaluated by carrying out charge-discharge cycles between 4.5 V and 3.0 V, in other words, the cut-off voltages for charging and discharging were set at 4.5 V and 3.0 V, respectively.

Preparation of Active Materials

Comparative Sample-a

Lithium carbonate and cobalt carbonate were mixed in an atomic ratio of lithium to cobalt of 1.2:1.0, fired at 900° C. for 6 hours in the air and cooled at a rate of 3° C./min to give $Li_{1.2}CoO_{2.1}$.

Comparative Sample-b

Lithium carbonate, sodium carbonate and cobalt carbonate were mixed in an atomic ratio: lithium/sodium/cobalt of 1.1:0.1:1.0, fired at 900° C. for 6 hours in the air and cooled at a rate of 3° C./min to give $Li_{1.1}Na_{0.1}CoO_{2.1}$.

Comparative Sample-c

Lithium carbonate, cobalt carbonate and titanium oxide (anatase type one) were mixed in an atomic ratio: lithium/cobalt/titanium of 1.2:1:0.05, fired at 900° C. for 6 hours in the air and cooled at a rate of 3° C./min to give $Li_{1.2}Co_{0.95}Ti_{0.05}O_{2.1}$. These comparative samples were formed into pellets according to the foregoing method and incorporated into coin-shaped batteries as positive electrode-pellets. The resulting batteries were subjected to charge-discharge tests.

The samples according to the present invention were prepared by mixing, in an automatic mortar, lithium carbonate, sodium carbonate, cobalt carbonate and titanium oxide (anatase type one) in an atomic ratio: Li:Na:Co:Ti falling within the range defined below, firing at 900° C. for 6 hours in the air, then cooling at a rate of 3° C./min to give compound oxides each comprising these 4 elements. The presence of sodium and titanium in the structure of each resulting compound oxide as dopants was confirmed by the fact that the X-ray diffraction pattern did not include any peak which could be ascribed to the oxides of sodium and titanium and corresponded to the presence of free oxides of these elements as impurities and by the fact that atomic-absorption spectroscopic analysis of each sample exhibited peaks showing the presence of these metals.

Composition of Positive Electrode-Active Materials

Comparative Sample a: $Li_{1.2}Co_{1.0}O_{2.1}$
Comparative Sample b: $Li_{1.1}Na_{0.1}Co_{1.0}O_{2.1}$
Comparative Sample c: $Li_{1.2}Co_{0.95}Ti_{0.05}O_2$
Present Invention 41: $Li_{1.05}Na_{0.15}Co_{0.92}Ti_{0.08}O_{2.1}$
Present Invention 42: $Li_{1.1}Na_{0.1}Co_{0.95}Ti_{0.05}O_{2.1}$
Present Invention 43: $Li_{1.12}Na_{0.08}Co_{0.95}Ti_{0.05}O_{2.1}$
Present Invention 44: $Li_{1.12}Na_{0.08}Co_{0.97}Ti_{0.03}O_{2.1}$
Present Invention 45: $Li_{1.16}Na_{0.04}Co_{0.97}Ti_{0.03}O_{2.1}$ The charge-discharge characteristics and the cycle properties of the foregoing samples were evaluated and summarized in the following Table 5. The results shown in Table 5 clearly indicate that the samples obtained by adding either Na as an alkali metal or Ti as a transition metal to the active material having a composition: $LiCoO_2$ (comparative samples b and c) suffer from a problem of a decrease in the initial capacity or the capacity during charge-discharge cycles, while the systems simultaneously comprising these two components exhibited stabilization of the capacity during charge-discharge cycles and the discharge voltage, i.e., these systems were substantially improved in the charge-discharge characteristics.

EXAMPLE 10

A coin battery was produced by repeating the same procedures used in Example 9 except that a common negative electrode, which was substituted for the negative electrode material (Li/Al) used in Example 9, was produced by mixing 82% by weight of $LiCoVO_4$ as the lithium atom-containing transition metal compound, 12% by weight of scaly graphite as a conductivity-imparting agent and 6% by weight of polyvinylidene fluoride as a binder to give a depolarizing mix, compression-molding the mix into negative electrode-pellets (13 mm ø, 0.060 g) and sufficiently drying the pellets contained in a dry box by a far infrared heater. Then the charge-discharge characteristics and the cycle properties thereof were evaluated in the same manner used in Example 9.

As a result, it was confirmed that the overall cycle properties of the discharge capacity of the battery were inferior to that of the battery in which Li/Al was used as the negative electrode. However, the superiority of the positive electrode-active material having the composition defined by the present invention was confirmed since the effect of the simultaneous addition of Ti and Na was almost identical to that listed in Table 5, i.e., there was observed improvement in the cycle properties (stabilization of both voltage and capacity) as compared with the comparative samples.

EXAMPLE 11

A variety of compound oxides having the following compositions were prepared according to the same procedures used in Example 9 except that manganese dioxide or nickel carbonate was substituted for cobalt carbonate used in Example 9 and firing was carried out at a temperature ranging from 700° to 900° C. for 6 to 10 hours.

Composition of Positive Electrode-Active Materials

Present Invention 46: $Li_{1.1}Na_{0.1}Mn_{1.92}Ti_{0.08}O_{4.1}$
Present Invention 47: $Li_{1.1}Na_{0.1}Mn_{1.95}Ti_{0.05}O_{4.1}$
Present Invention 48: $Li_{1.15}Na_{0.05}Mn_{1.92}Ti_{0.08}O_{4.1}$
Present Invention 49: $Li_{1.15}Na_{0.05}Mn_{1.95}Ti_{0.05}O_{4.1}$
Present Invention 50: $Li_{1.06}Na_{0.04}Mn_{1.97}Ti_{0.03}O_{4.1}$
Present Invention 51: $Li_{1.1}Na_{0.1}Ni_{0.92}Ti_{0.08}O_{2.1}$
Present Invention 52: $Li_{1.1}Na_{0.1}Ni_{0.95}Ti_{0.05}O_{2.1}$
Present Invention 53: $Li_{1.15}Na_{0.05}Ni_{0.92}Ti_{0.08}O_{2.1}$
Present Invention 54: $Li_{1.15}Na_{0.05}Ni_{0.95}Ti_{0.05}O_{2.1}$
Present Invention 55: $Li_{1.08}K_{0.02}Co_{0.97}Ti_{0.03}O_{2.05}$
Present Invention 56: $Li_{1.08}K_{0.02}Mn_{1.97}Ti_{0.03}O_{4.05}$
Present Invention 57: $Li_{1.08}K_{0.02}Ni_{0.97}Ti_{0.03}O_{2.05}$ Coin batteries were produced using the foregoing pellets of the active material as positive electrodes and Li/Al as negative electrodes like the battery of Example 9 and the charge-discharge characteristics thereof were evaluated in the same manner. As a result, all of the samples of the present invention were improved in the cycle properties, in particular, in the voltage stability as compared with the comparative samples to which either an alkali metal (Na or K) or Ti was added. Marked improvement in the cycle properties was observed, in particular, in the systems to which not more than 5% of Na or K and not more than 5% of Ti were added. Moreover, the effects attained by Co, Mn, Ni as the main transition metal component in the structural formula were compared with one another (inclusive of the results listed in Table 5) and as a result, it was found that the optimum effect of the invention was achieved through the use of Co.

It can be concluded, from the foregoing experimental results, that particularly excellent battery quality and cycle properties would be expected when in the general formula: $Li_xA_yM_zT_mO_p$, A is Na and M is Co and when the amounts thereof fall within the ranges: $0.02 \leq y \leq 0.1$ and $0.02 \leq m \leq 0.10$, respectively.

TABLE 5

| Sample No. | Discharge Capacity mAh | Average Discharge Voltage V vs. Li/Al | Capacity-Maintaining Rate (%) After 50 Cycles | Voltage-Maintaining Rate (%) After 50 Cycles |
|---|---|---|---|---|
| a* | 9.0 | 3.90 | 67.7 | 96.0 |
| b* | 9.0 | 3.95 | 35.4 | 87.5 |
| c* | 8.9 | 3.90 | 67.5 | 99.8 |
| 41 | 8.9 | 3.92 | 68.8 | 98.5 |
| 42 | 9.1 | 3.95 | 75.5 | 99.5 |
| 43 | 9.2 | 4.00 | 80.5 | 99.8 |
| 44 | 9.2 | 3.98 | 80.3 | 99.7 |
| 45 | 9.1 | 3.95 | 77.7 | 99.5 |

*Comparative Sample.

What is claimed is:

1. A lithium ion type nonaqueous electrolyte-secondary battery comprising a positive electrode which comprises, as an active material, a compound oxide represented by the following chemical formula (I):

$$Li_xA_yM_zJ_mO_p \quad (I)$$

wherein A represents at least one alkali element selected from the group consisting of Na and K; M represents at least one transition element selected from the group consisting of Co, Mn and Ni; J represents an element selected from the group consisting of B, Si, Ge, P, V, Zr, and Sb; $0.8 \leq x \leq 1.3$; $0.01 \leq y \leq 0.2$; $0.8 \leq z \leq 2.0$; $0.01 \leq m \leq 0.2$; and $2.0 \leq p \leq 4.7$; a negative electrode; and a nonaqueous electrolyte.

2. The nonaqueous electrolyte-secondary battery of claim 1 wherein, in the chemical formula (I), A represents Na and M represents Co; and $0.8 \leq x \leq 1.3$; $0.02 \leq y \leq 0.1$; $0.8 \leq z \leq 1.0$; $0.02 \leq m \leq 0.1$; and $2.0 \leq p \leq 2.7$.

3. The nonaqueous electrolyte-secondary battery of claim 1 wherein, in the chemical formula (I), A represents Na; M represents Co; and J represents P or V.

4. The nonaqueous electrolyte-secondary battery of claim 1 wherein the positive electrode-active material is a compound oxide represented by the following chemical formula: $Li_xM_z Ge_mO_p$ (wherein M represents at least one transition element selected from the group consisting of Co, Mn and Ni; $0.9 \leq x \leq 1.3$; $0.8 \leq z \leq 2.0$; $0.01 \leq m \leq 0.2$; and $2.0 \leq p \leq 4.5$).

5. The nonaqueous electrolyte-secondary battery of claim 4 wherein, in the chemical formula of the compound oxide, M represents Co; $0.9 \leq x \leq 1.3$; $0.8 \leq z \leq 1.0$; and $2.0 \leq p \leq 2.2$.

6. The nonaqueous electrolyte-secondary battery of claim 4 wherein the compound oxide positive electrode-active material has an average particle size of not more than 2.5 μm.

7. The nonaqueous electrolyte-secondary battery of claim 1 wherein the positive electrode-active material is a compound oxide represented by the following chemical formula: $Li_xA_yM_zT_mO_p$ (wherein A represents at least one alkali element selected from the group consisting of Na and K; M represents at least one transition element selected from the group consisting of Co, Mn and Ni; $0.8 \leq x \leq 1.3$; $0.01 \leq y \leq 0.2$; $0.8 \leq z \leq 2.0$; $0.01 \leq m \leq 0.2$; and $2.0 \leq p \leq 4.7$).

8. The nonaqueous electrolyte-secondary battery of claim 7 wherein, in the chemical formula of the compound oxide, A represents Na and M represents Co.

9. The nonaqueous electrolyte-secondary battery of claim 7 wherein, in the chemical formula of the compound oxide, A represents Na; M represents Co; $0.8 \leq x \leq 1.3$; $0.02 \leq y \leq 0.1$; $0.8 \leq z \leq 1.0$; $0.02 \leq m \leq 0.1$; and $2.0 \leq p \leq 2.7$.

10. The nonaqueous electrolyte-secondary battery of claim 1 wherein the nonaqueous electrolyte comprises a propylene carbonate or ethylene carbonate-containing mixed solvent and a supporting salt.

11. The nonaqueous electrolyte-secondary battery of claim 1 wherein a carbonaceous material is used as an active material for the negative electrode.

12. The nonaqueous electrolyte-secondary battery of claim 1 wherein the nonaqueous electrolyte comprises a mixed solvent containing at least two members selected from the group consisting of propylene carbonate, ethylene carbonate, diethyl carbonate and methyl propionate and a supporting salt.

* * * * *